Figure 1:
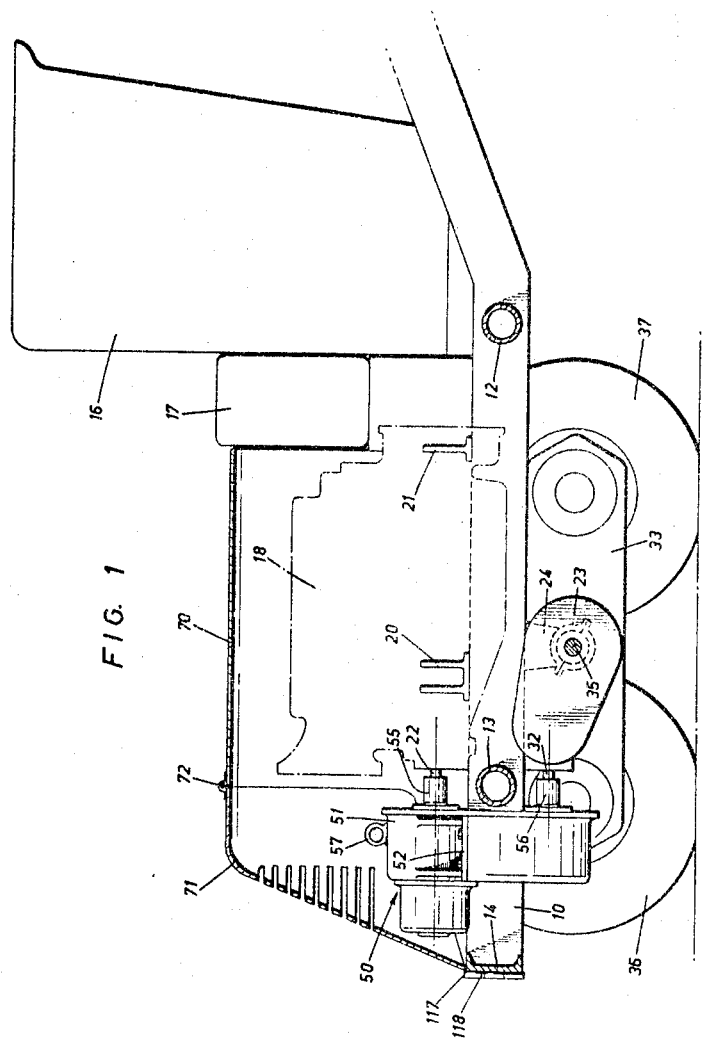

Aug. 30, 1966  J. G. MACDONALD  3,269,479
MEANS FOR MOUNTING TRANSMISSIONS ON TANDEM-WHEELED ROAD GRADERS
Filed Jan. 19, 1965  2 Sheets-Sheet 2

*Inventor*
JOHN G. MACDONALD by: *Douglas E. Jr*
*Attorney*

3,269,479
MEANS FOR MOUNTING TRANSMISSIONS ON TANDEM-WHEELED ROAD GRADERS
John Graham Macdonald, Goderich, Ontario, Canada, assignor to The Dominion Road Machinery Co., Limited, Goderich, Ontario, Canada
Filed Jan. 19, 1965, Ser. No. 426,543
2 Claims. (Cl. 180—22)

This invention relates to vehicles and more particularly, to the provision of transmission systems in heavy vehicles such as road graders or the like.

Earth moving equipment and similar types of vehicles such as road graders represent a large capital investment, from which the owner requires a good return. However, this object is frequently frustrated due to the equipment being out of service because of mechanical failure. These failures arise from the nature of the work which road graders and the like are expected to perform, in many instances from abuse.

It has been found that a high incidence of mechanical fault arises in the transmission system, that is, for the purposes of this specification, between the engine output and the input to the final drive. The nature of these faults is such that expert service is required and if the vehicle is operated at any great distance from a reliable service source the machine is completely disabled for an extended period. These failures are consequently expensive both to the owner and the contractor, in many instances critical to the difference between profit and loss.

There are essentially two aspects to the vehicle performance, its reliability and freedom from maintenance, and the service available. No matter how reliable the equipment may be, and this is usually attended by added costs to the equipment, service is still a primary concern. The most reliable vehicles break down and the problem of providing efficient services remains. It is not always possible to provide a convenient source of service and it is not always certain that the service source is itself reliable.

In this present invention, the applicant provides a heavy vehicle of the type described, the combination comprising a frame, an engine mounted on said frame adjacent one end thereof, said engine including an output shaft extending toward the adjacent end of said frame, ground-engaging traction means, a final drive in operative connection with said traction means, said final drive including an input shaft extending toward the adjacent end of said frame, a separable transmission unit removably mounted on said frame, said transmission unit including an input adapted to be connected to said engine output and an output adapted to be connected to said final drive input; and means to secure said transmission unit input and said engine output in operable engagement and said transmission output and said final drive input.

By the above structure the servicing of the equipment is facilitated. The transmission unit may be removed from the engine and final drive by means of a minimum of equipment and simply slid along the vehicle frame and on to a dolly. A spare transmission unit can be substituted with equal ease and the vehicle placed back in service with a minimum of down time. The faulty transmission unit may then be shipped to the manufacturer or the nearest service depot.

It is accordingly the main object of this invention to provide a road grader or a like heavy vehicle which may be serviced with facility and with a minimum of down time.

It is another object of the present invention to reduce the cost of maintaining road graders or similar heavy vehicles.

It is yet another object of this invention to provide a road grader with a separable transmission unit which may be removed with facility even in the field.

Figure 2:
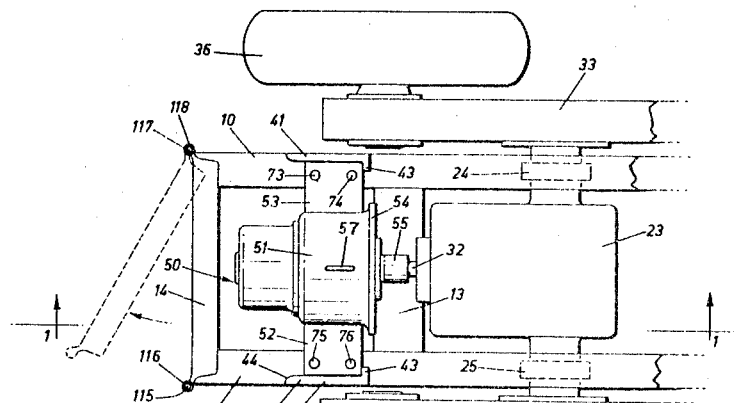

These objects and various other objects and features of the invention will become more apparent from the following description and the accompanying drawings in which a specific embodiment is set forth by way of illustration, and in which:

FIGURE 1 is a partial sectional view of the rear end of a road grader embodying the present invention taken along line 2—2 of FIGURE 2.

Figure 3:
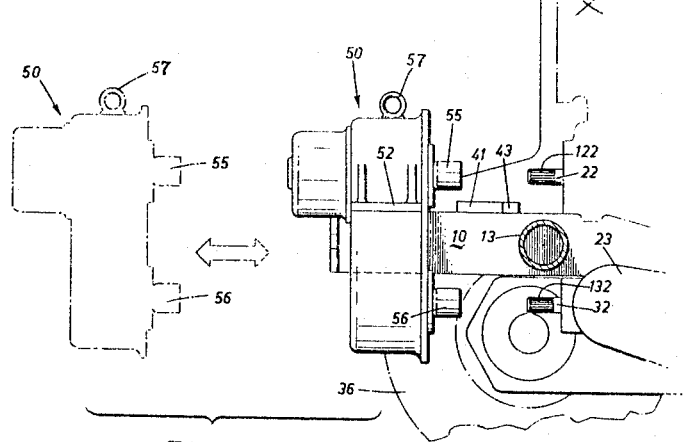

FIGURE 2 is a plan view of the rear end of the road grader illustrated in FIGURE 1 with the operator's cab and engine removed to illustrate the relationship of the transmission output and the final drive gear unit; and FIGURE 3 is an enlarged fragmentary sectional view of the rear end of the road grader as in FIGURE 1 and serves to illustrate the mode of mounting and demounting the transmission unit.

Referring now to the drawings, in FIGURE 1 is illustrated a partial sectional view of the rear end of a road grader taken along line 1—1 of FIGURE 2. For convenience, in this drawing, details of the various sections are omitted.

In this embodiment, the frame of the road grader comprises a pair of longitudinally extending side members 10 and 11 which are held in a rigid spaced apart relationship by spaced transverse members such as 12 and 13. Transverse member 13 extends between side members 10 and 11 inward of the outer end thereof and between the ends of these side members 10 and 11 is a further transverse member 14. Transverse member 14 is not essential to the structure of the frame and is secured to either one or other or both of transverse members 10 and 11 by means of a pin and eye structure such as 115 and 116, or 117 and 118 on side members 11 and 10, respectively. As illustrated by the dotted outline in FIGURE 2, when either of pins 117 or 115 are removed, the arrangement permits end member 14 to be swung about pin 117 or pin 115 to permit access to interior of the frame. An operator's cab 16 is disposed over side members 10 and 11.

To the rear of tank 17 an engine 18 shown only in outline is mounted on the frame. The engine 18 is provided on either side with lugs or brackets such as 20 and 21 which sit upon or engage the respective top surfaces of frame members 10 and 11. The engine is then rigidly secured to the frame by such means as bolts. It will, of course, be understood that any equivalent method of securing may be employed. It will be noticed from FIGURE 1 that an engine output shaft 22 extends rearwardly towards frame member 14.

Immediately below engine 18 a final drive unit 23 is dependingly secured from frame members 10 and 11 by means of clamps such as 24 and 25. The final drive unit 23 is provided with an input shaft 32 which, like the engine output shaft 22, extends towards the rear of the vehicle. External to side members 10 and 11 a pair of tandem drive cases 33 and 34 are pivotably secured to the outer ends of the final drive 35, and on tandem cases 33 and 34, driving wheels such as 36 and 37 are mounted in a conventional manner.

Again, rearward of the engine 18, a pair of guide lugs or brackets 40 and 41 are secured to the upper surface of side frame members 11 and 10 respectively, and in a predetermined relationship therewith.

Guide lug 40, like guide lug 41, comprises a laterally extending side wall 42 having an inwardly extending projection 43 at the end remote from frame member 14, and side wall 42 is curved as at 44 at the end adjacent to member 14 to facilitate the mounting of a transmission unit 50. It will, of course, be understood that these guide means may be of any desirable form and in some arrangements, dispensed with altogether.

Transmission unit 50 comprises a speed changing mechanism which may be of any type well known to those skilled in the art. This unit is mounted within a housing 51. From the side wall of housing 51, a pair of laterally extending flanges 52 and 53 extend and from the front wall 54 of housing 51 a transmission unit input shaft 55 and a transmission unit output shaft 56 extend in a forward direction in a predetermined spaced apart relationship. There is also provided on the upper wall of housing 50 an eye 57 to facilitate removal if need be, by means of a hook.

As illustrated in FIGURE 3, engine output shaft 22 has a splined end portion 122 and similarly, the final drive unit input shaft 32 has a splined end portion 132. In this embodiment, the transmission unit input shaft 55 comprises an internally splined sleeve and similarly, transmission output shaft 56 comprises an internally splined sleeve.

It will, of course, be understood that while in this embodiment the use of splined shafts and sleeves has been illustrated, other forms of equally suitable connections such as universal couplings or the like, may be employed.

The lateral flanges 52 and 53 on housing 50, the input and output shafts 55 and 56 thereof, the engine output shaft 22 and the final drive input shaft 32 are so dimensioned and relatively disposed that when the transmission unit 50 is mounted on to frame members 10 and 11 in the relationship illustrated in FIGURE 2, sleeves 55 and 56 cooperate with the respective splined ends of shafts 22 and 32 to effect an operable engagement.

However, it will be observed that the dispositions of the output shaft 22 of the engine and the input shaft 32 of the final drive unit are such when the engine and final drive unit are mounted upon frame members 10 and 11 that when these shafts cooperate with the transmission input and output 55 and 56 respectively, the transmission unit 50 is mounted rearward of transverse member 13.

Over the engine 18 and transmission unit 50 an engine cowl 70 is mounted on frame members 10 and 11, frame member 70 hinged as at 72 to provide a forward cowl portion 71 which may be swung up in the manner illustrated in FIGURE 3.

The facility with which the road grader embodying the present invention may be serviced if there is a breakdown in the transmission unit 50 is illustrated in FIGURE 3. All that the operator need do is remove pin 115 and swing back transverse member 14 in the manner illustrated in FIGURE 2. The forward portion 71 of engine cowling 70 is swung up about hinge 72 to assume the position illustrated in FIGURE 3 and bolts 73, 74, 75 and 76 are removed. The transmission unit is controlled from the operator's cab and these controls although not shown, are disconnected. The transmission unit 50 is then slid rearwardly along frame members 10 and 11 onto a waiting dolly illustrated in FIGURE 3 or if available, simply lifted by means of a block and tackle having a hook engaging with eye 56. There is, of course, no necessity to employ an overhead hoist by virtue of the mounting height of the transmission unit 50.

To replace a transmission unit, a unit such as 50 is mounted upon the end of side members 10 and 11 and moved forward until the lateral flanges 52 and 53 engage the adjacent curved ends of guide lugs 40 and 41. These lugs serve to align the transmission unit input 55 and transmission unit output 56 with the engine output shaft 22 and the final drive input shaft 32 respectively. The transmission unit is then slid forward so that input 55 and output 56 engage shafts 22 and 32 respectively. The turned in portions 43 of the guide lugs 40 and 41 serve as stops and will limit the forward travel of the transmission unit. When the various components have been correctly aligned and the requisite engagement has been made, bolts 73, 74, 75 and 76 are made secure. The frame member 14 and the hinged portion 71 of cowl 70 are swung into their respective positions as illustrated in FIGURE 1 and the grader is again operational.

It will thus be seen by means of the above that a road grader illustrated in accordance with the foregoing specification provides a machine which is easily and readily serviceable even by unskilled labour and no special equipment or tools are required to execute the operation so that it may be accomplished in the field by the operator himself.

Although a preferred form of this invention has been illustrated and described, it will be understood that other forms may exist and various changes may be made therein without departing from the spirit and scope of the invention as defined in the appended claims.

What I claim as new and desire to protect by Letters Patent of the United States is:

1. In a road grader, the combination comprising a frame including a rear portion extending substantially horizontally, said rear portion comprising a pair of longitudinal channel members in spaced apart parallel relation to each other, a final drive gear unit secured to the underside of said channel members, a pair of wheel supporting tandem drive units pivoted on said final drive gear unit, a splined shaft extending rearwardly from said final drive gear unit, said splined shaft being generally parallel to said channel members, an engine to drive said grader, said engine being disposed above said final drive gear unit and support members on said engine secured to an upper portion of said channel members, said engine having a splined shaft extending rearwardly therefrom and generally parallel to said channel members, a power transmission unit having upper and lower shaft members extending forwardly therefrom, a laterally extending flange on each side of said power transmission unit, said flanges being so positioned in relation to said channel members that when said power transmission unit is moved forwardly along said channel members, the weight of said power transmission unit will be supported on said channel members, and said upper and lower shaft members on said power transmission unit will be slidably engaged with the splined shaft on said engine and the splined shaft of said final drive gear unit, at least one cross member extending between said channel members in front of said power transmission unit, and channel members extending rearwardly of said power transmission unit, and a cross-member extending and secured between the rearward ends of said channel members, at least one end of said cross-member being detachably secured to provide an opening between said channel members to facilitate removal or installation of said transmission.

2. The construction as claimed in claim 1 in which guide means are provided on said channel members, said guide means engageable with the flanges on said power transmission unit to ensure alignment of said shafts when said power transmission unit is moved along said channel members.

References Cited by the Examiner
UNITED STATES PATENTS

| | | | |
|---|---|---|---|
| 1,126,592 | 1/1915 | Twonobly | 180—64 |
| 1,266,537 | 5/1918 | Masury | 180—70 |
| 1,592,970 | 7/1926 | Dernier | 180—42 |
| 1,770,279 | 7/1930 | Morrison. | |
| 2,124,166 | 7/1938 | Wallet | 180—70 X |
| 2,199,517 | 5/1940 | Best | 180—54 |
| 2,261,429 | 11/1941 | Peterson | 180—70 |
| 2,296,181 | 9/1942 | Perkins | 180—64 |
| 2,307,857 | 1/1943 | Rodler. | |
| 2,578,156 | 12/1951 | Smith | 180—70 X |
| 3,101,150 | 8/1963 | Janson et al. | 180—54 X |

A. HARRY LEVY, *Primary Examiner.*